Patented Mar. 17, 1936

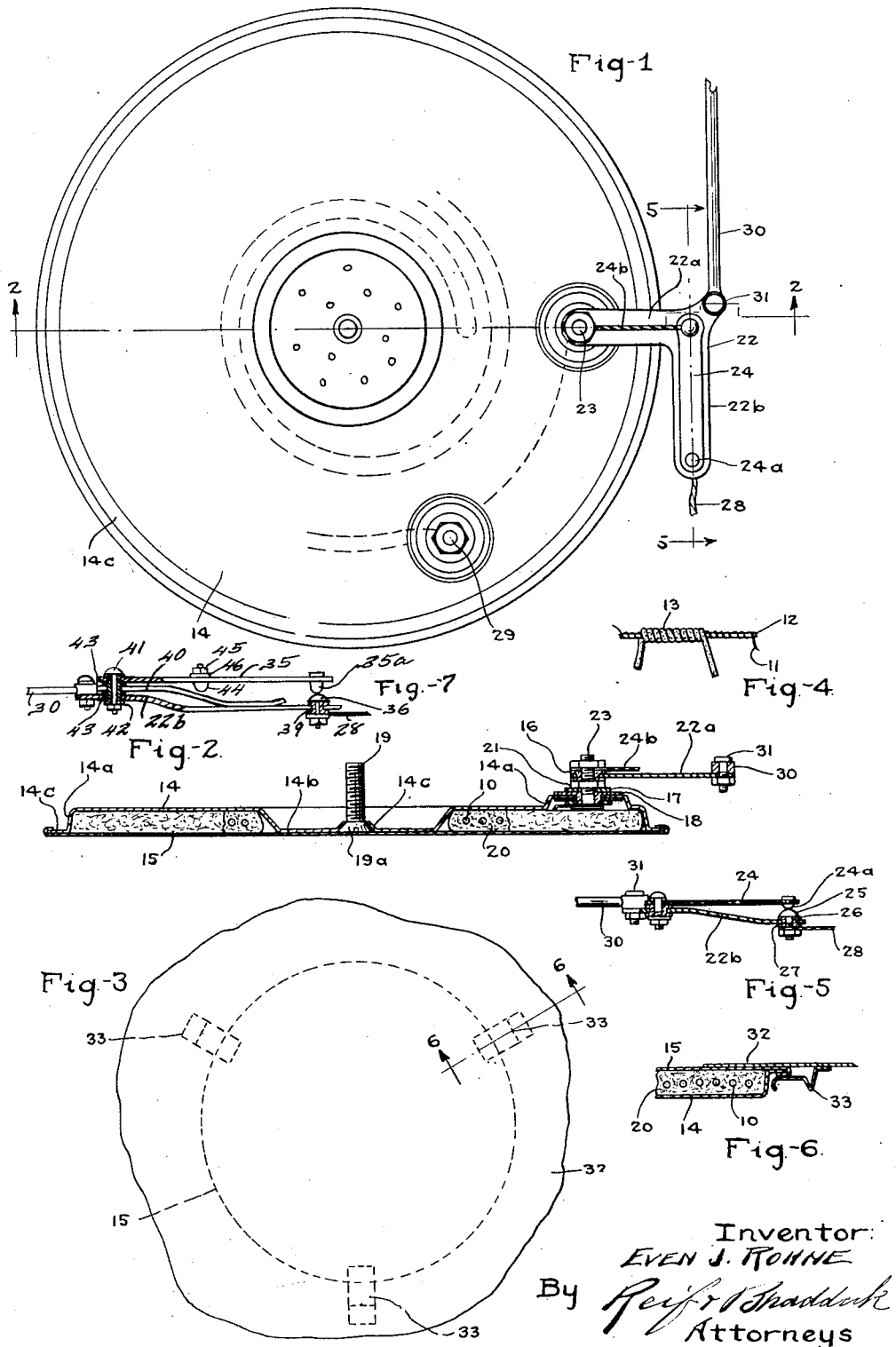

2,034,486

UNITED STATES PATENT OFFICE 2,034,486

HEATING ELEMENT

Even J. Rohne, Minneapolis, Minn., assignor to Robert Ladue, Minneapolis, Minn.

Application May 1, 1931, Serial No. 534,195

4 Claims. (Cl. 219—37)

This invention relates to a heating element, and particularly to an electrical heating element such as is used for heating hot plates, various vessels, electric stoves, etc. It is desirable in such a heating element, to have one which is quite simple in construction and which can be easily and inexpensively made. It is also desirable to have a heating element which can be readily attached to a hot plate or other device in connection with which it is used. It is a further desideratum to provide a heating element comprising few parts, which can be easily made and assembled, and it is also desirable to have a thermostat in connection with the heating element, for variably regulating the temperature thereof.

It is an object of this invention, therefore, to provide a heating element of simple and efficient construction.

It is a further object of the invention to provide a heating element of comparatively flat thin construction, and comprising slightly spaced plates between which the electrical resistance member is enclosed.

It is a further object of the invention to provide such a heating element as set forth in the preceding paragraph, said plates being secured together at their central portions and peripheral portions, and preferably being in contact at their central portions.

It is still another object of the invention to provide a heating element comprising an electrical resistance member held between spaced plates, said element having an attaching means preferably in the form of a threaded screw rigidly secured thereto and projecting centrally therefrom at one side.

It is still another object of the invention to provide such a heating element as set forth in the preceding paragraph, the same having contact screws projecting at the same side thereof as said first mentioned screws.

It is also an object of the invention to provide a heating element having attached thereto an oscillatable member carrying a thermostat, which member can be moved closer to or farther from said element to variably regulate the temperature thereof.

It is still another object of the invention to provide a heating element comprising spaced connected plates having a thin offset rim at its peripheral edge, by which it can be easily supported.

These and other objects and advantages of the invention will be fully set forth in the following description made in connection with the accompanying drawing, in which like reference characters refer to similar parts throughout the several views, and in which:—

Fig. 1 is a bottom plan view of the device;

Fig. 2 is a vertical section taken on line 2—2 of Fig. 1;

Fig. 3 is a bottom plan view of a hot plate or vessel used in connection with the device, showing one method of attaching the same;

Fig. 4 is a partial view showing the form of resistance element used;

Fig. 5 is a vertical section taken on line 5—5 of Fig. 1;

Fig. 6 is a vertical section taken on line 6—6 of Fig. 3, and

Fig. 7 is a view similar to Fig. 5, showing a modified form of thermostat.

Referring to the drawing, a heating element is shown comprising an electrical resistance element 10. While various forms of resistance elements might be used, in the embodiment of the invention illustrated the particular form used comprises a flexible cord 11 of insulating material, on which is helically wound the small wire 12. Parts 11 and 12 are then helically wound with another heavier cord 13 of insulating material. The cord 13 is then, with the enclosed portions 11 and 12, spirally arranged in one plane between metal plates 14 and 15. The ends of resistance element 12 are connected to contact members or screws 16 which project through plate 14 and are insulated therefrom by the bushing 17 and the washers 18, plate 14 being provided with a recess 14a for receiving the members surrounding the screws 16. Plate 15 is shown as flat or disposed substantially in one plane, while plate 14 is shown as having an offset or pressed in central portion 14b engaging the central portion of plate 15. Portion 14b is further provided with a depressed frusto-conical recess 14c in which is disposed the head 19a of a screw 19, said head being rigidly secured to plate 14b, preferably by welding and the threaded shank portion of said screw 19 projecting at one side of the element and plate 14. Plate 14 is formed with a rim portion 14d, being thus somewhat of cupped or dished shape, and said plate also has a peripheral flange 14e offset from its main surface and forming the periphery thereof. Plate 15 has its peripheral edge crimped over the edge of flange 14e as clearly shown in Fig. 2. The resistance member 10 is embedded in a refractory material such as clay 20 which fills the air-tight enclosure between plates 14 and 15.

The screws 16 are provided with nuts 21 and one of these is further provided with a pair of washers 22 between which is disposed the apertured end of one arm 22a of a plate 22 having another arm 22b disposed substantially at right angles to arm 22a. A nut 23 threaded onto the member 16 secures the arm 22 in place so that it is pivotally or swingably mounted on member 16. Arm 22b has a thermostatic strip 24 secured thereto at one end, the same being secured to plate 22 and insulated therefrom. The free end of the strip 24 carries a contact member 24a adapted to engage a contact screw 25 secured in the outer end of arm 22b and insulated therefrom the bushing 26 and washer 27. Contact screw 25 is adapted to hold in place one end of a conductor 28, and another conductor 29 is secured to the other contact member 16. A conductor 24b connects member 24 and screw 16. Current is supplied to the heating element through conductors 28 and 29. Arm 22 has secured thereto at its corner, or substantially at the vertex of the right angle, a rod 30 pivotally connected by a pivot member 31. Rod 30 will extend to the front or convenient portion of the device to which the heating element is attached.

The heating element may be attached by the screw 19 or it can be easily secured to a hot plate 32 which may also constitute the bottom of the vessel to be heated. Plate 32 has secured thereto as by welding, the ends of a plurality of spring clips 33 shown as three in number, the same being provided with the bends 33a and slightly outturned at their free ends. The free ends of the clips engage under the thin rim formed at the edge of the heating element by flange 14e and the crimped edge of the plate 15. The heating element can be secured in place by being moved into contact with two of the clips and the other clip can then be sprung outwardly sufficiently to pass over the edge of said rim.

In operation, the heating element will be disposed beneath a hot plate, vessel or other member to be heated, and will be supplied with current from any convenient source, through the conductors 28 and 29. The plates 14 and 15 will be heated and plate 14 will conduct a large amount of heat to the central portion of the plate 15 through the portion 14b which contacts with plate 15. The plate 22 carrying the thermostat can be swung about the axis of contact member 16 to which it is attached, so as to be brought closer to or farther from the heating element. When it is in its farthest position, the heating element will be heated to the greatest degree. If the thermostat is brought closer to the heating element, it will be heated more quickly and the heating element will be kept at a lower temperature. By moving the thermostat, therefore, the degree of heat can be variably regulated. The thermostat can be readily moved by the operating rod 30.

In Fig. 7 a modified form of thermostat is shown, in which the plate 22 is used as already described, and has the arm 22b projecting as shown in Fig. 1. An arm 35 of metal is used, which carries at its end the contact 35a. This contact is adapted to engage the head of a screw 36 extending through the end of plate 22b, to which is connected, as already described, the conductor 28. Screw 36 is insulated from arm 22b by the insulating bushing 39. A thermostatic bar 40 is provided, disposed between arm 22b and bar 35, the same having its outer end bent downwardly and engaging arm 22b. Bar 40 and the member 35 are connected to member 22 by the headed and nutted bolt 41 extending through said members, the same being insulated from said arms by the insulating bushing 42 and said members being separated by insulating washers 43. The rod 30 is connected to member 22 as shown in Figs. 1 and 5. A button-like member 44 is secured to member 35 above the thermostatic bar 40 and is carried on a threaded stud having thereon a nut 45 beneath which can be placed one or more washers 46.

In operation the heat from the heating element of the device will actuate the thermostatic bar 40 which will be flexed downwardly and when the heat is sufficient, will separate the contacts 35a and 36. The member 44 can be used for securing the necessary adjustment of bar 40 and can be positioned in contact with said bar if desired. Otherwise, the operation is the same as already described in connection with the structure shown in Figs. 1, 2 and 5.

From the above description it is seen that applicant has provided a very simple and efficient heating element. The element can be readily attached to a hot plate or other member to be heated by the screw 19, and in some cases can be attached by means of a rim as shown in Fig. 3. The parts of the device are very few and these parts can be easily and inexpensively made and assembled. The device is very compact and occupies little space in the device with which it is used. The device is provided with an entire metal exterior, and is thus quite durable. The resistance element can be arranged as disclosed in applicant's prior Patent No. 1,629,738, if desired. The same has been amply demonstrated in actual practice, and found to be very successful and efficient.

It will, of course, be understood that various changes may be made in the form, details, arrangement and proportions of the parts, without departing from the scope of applicant's invention, which, generally stated, consists in a device capable of carrying out the objects above set forth, in the novel parts and combinations of parts disclosed and defined in the appended claims.

What is claimed is:—

1. A heating element having in combination, an electrical resistance member, substantially parallel spaced plates disposed respectively at either side of said member, one of said plates having a circular offset portion at the center thereof, and an offset peripheral portion, said offset central portion being welded to the other plate, said latter plate having its edge crimped over the edge of said peripheral portion.

2. A heating element having in combination, an electrical resistance member, spaced plates disposed at either side thereof, a contact member secured to one end of said resistance member and projecting at one side of one of said plates, a thermostat pivotally mounted on said contact member, and means connected to said thermostat for moving it nearer to or farther from said element.

3. A heating element having in combination, an electrical resistance element, spaced plates disposed respectively at either side thereof and secured together, a member having arms extending at right angles to each other and pivotally connected adjacent the end of one arm to one of said plates, the other arm of said member carrying a thermostat, and a rod secured adjacent the vertex of said right angle for swinging said thermostat toward and from said element.

4. A heating element having in combination, spaced plates, one of the same being offset adjacent its central portion to contact the other plate, and having a recess formed therein at its central portion, a screw having a head seated in said recess and welded therein between said plates, said screw having a threaded shank projecting freely from said plate and element.

EVEN J. ROHNE.